US012745162B2

(12) United States Patent
Werner et al.

(10) Patent No.: US 12,745,162 B2
(45) Date of Patent: Sep. 22, 2026

(54) PROXIMITY ESTIMATION FOR UNIVERSAL CONTROL

(71) Applicant: APPLE INC., Cupertino, CA (US)

(72) Inventors: Benjamin A. Werner, San Jose, CA (US); Kevin J. Van Vechten, Montecito, CA (US); Robert W. Mayor, Half Moon Bay, CA (US); Brent M. Ledvina, San Francisco, CA (US); Brian G. Kilberg, Berkeley, CA (US); Subash Marri Sridhar, San Jose, CA (US); Alejandro A. Rodriguez, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 17/931,842

(22) Filed: Sep. 13, 2022

(65) Prior Publication Data

US 2023/0308994 A1 Sep. 28, 2023

Related U.S. Application Data

(60) Provisional application No. 63/269,773, filed on Mar. 22, 2022.

(51) Int. Cl.

*H04W 48/16* (2009.01)
*H04W 28/18* (2009.01)
*H04W 28/26* (2009.01)

(52) U.S. Cl.

CPC .......... *H04W 48/16* (2013.01); *H04W 28/18* (2013.01); *H04W 28/26* (2013.01)

(58) Field of Classification Search

None

See application file for complete search history.

(56) References Cited

U.S. PATENT DOCUMENTS 9,784,417 B1 * 10/2017 Springer ................ F21K 9/232
2012/0047407 A1 * 2/2012 Tilwani ................ H04L 1/1841
714/E11.067

(Continued)

FOREIGN PATENT DOCUMENTS

CA 3027015 C * 12/2020 .......... H05B 47/105
WO WO-2008156301 A2 * 12/2008 .......... H04L 1/1832

*Primary Examiner* — Christopher T Wyllie

(74) *Attorney, Agent, or Firm* — Kilpatrick Townsend & Stockton LLP

(57) ABSTRACT

In some aspects a first electronic device may detect a triggering condition for enabling control of a second electronic device. Upon detection of the triggering condition, the method can include determining an increased rate of transmission of advertising signals of a wireless protocol transmitted from a wireless transceiver of the first electronic device. The method can include transmitting a plurality of advertising wireless signals at the increased rate using the wireless protocol. The method can include receiving, from the second electronic device, one or more responses to the advertising wireless signals. The method can include determining a distance measurement based on the one or more responses. Responsive to the distance measurement being less than a threshold value, the method can include enabling control of one or more components of the first electronic device or the second electronic device by the other device. Numerous other aspects are described.

20 Claims, 9 Drawing Sheets

(56) References Cited

U.S. PATENT DOCUMENTS

2012/0146918 A1* 6/2012 Kreiner ................ G06F 3/0481 345/173
2014/0106735 A1* 4/2014 Jackson ............ H05B 47/1965 455/419
2015/0350297 A1* 12/2015 Yang ...................... G06F 1/163 715/740
2016/0088424 A1* 3/2016 Polo ..................... H04W 88/04 455/41.1
2016/0277560 A1* 9/2016 Gruberman .......... H04W 24/08
2016/0286624 A1* 9/2016 Patel ................... H04B 1/3833
2017/0055126 A1 2/2017 O'Keeffe
2017/0094494 A1* 3/2017 Douglas ................. H04W 4/80
2017/0127372 A1* 5/2017 Patel .................... H04W 4/021
2017/0374629 A1* 12/2017 Ramappa ........... H04W 52/283
2018/0324829 A1* 11/2018 Van Driest ........ H04W 56/0015
2018/0338330 A1* 11/2018 Ledvina ............... H04W 12/50
2018/0374180 A1* 12/2018 Sprogis ................. G06Q 50/40
2019/0277465 A1* 9/2019 Wright .................. H05B 47/19
2019/0297134 A1* 9/2019 Gold ................ H04M 1/72415
2019/0385393 A1* 12/2019 Bianchi ............ H04W 52/0245
2020/0090151 A1* 3/2020 Francis ................. G06Q 20/18
2020/0106877 A1* 4/2020 Ledvina ............... H04W 12/06
2020/0162889 A1* 5/2020 Desai ..................... H04W 8/12
2020/0187147 A1* 6/2020 Meerbeek ............ H04W 4/029
2020/0213152 A1* 7/2020 Choquette .............. H04L 47/15
2021/0076163 A1* 3/2021 Burowski .............. H04W 4/08
2021/0092786 A1* 3/2021 Uddin .................. H04W 76/15
2021/0141073 A1* 5/2021 Okazaki ............... H04W 48/16
2022/0070667 A1* 3/2022 Victa .................... H04L 12/189
2022/0248139 A1* 8/2022 Yore ..................... H03G 5/165
2022/0358830 A1* 11/2022 Detwiler ............... G06V 40/12
2023/0039220 A1* 2/2023 Bai ...................... H04B 7/0626
2023/0171579 A1* 6/2023 Stridkvist .............. H04W 4/80 370/329
2023/0189394 A1* 6/2023 Deshmukh ........... H04L 5/0055 370/329
2023/0308994 A1* 9/2023 Werner ................ H04W 28/26
2024/0155756 A1* 5/2024 Haverlag .............. H05B 47/19

* cited by examiner

| | Scan Window (ms) /Scan Interval (ms) | Advertise Interval (ms) | Time to *x* samples (95th %) |
|---|---|---|---|
| 308 | *N* / 10**N* | 9**N* | 30 – 40 sec |
| 310 | *N* / 3**N* | 9**N* | 10 – 15 sec |
| 312 | *N* / 10**N* | *N* | 3 - 6 sec |
| 314 | *N* / 3**N* | *N* | 1 – 2 sec |

PROXIMITY ESTIMATION FOR UNIVERSAL CONTROL

CROSS-REFERENCES TO RELATED APPLICATIONS

This application claims priority to and incorporates by reference commonly owned U.S. Patent Application Ser. No. 63/269,773, filed Mar. 22, 2022, entitled "Proximity Estimation for Universal Control," in its entirety and for all purposes.

BACKGROUND

Electronic devices can use a measured proximity to trigger certain features on those devices. Wireless transmissions can be used to measure the proximity between the electronic devices. Often the calculation of the proximity between the electronic device can take longer than expected due to fading of the wireless signals caused by multipath propagation of the wireless signals. Proximity can be used as at least one condition to activate these features to avoid inadvertently triggering devices inside wireless communication range but in a different room (outside a threshold range). The delay in proximity determination can result in a poor user experience because a user may incorrectly assume that the feature is not working properly.

BRIEF SUMMARY

Various techniques can be implemented in electronic devices to improve the proximity determination while minimizing impact on power consumption of the electronic devices. Certain techniques can measure the received signal strength indicator (RSSI) of a wireless signal (e.g., Bluetooth or Bluetooth Low Energy (BLE)). A receiving device can measure the RSSI of a wireless signal to determine a range or proximity of the transmitting device. The wireless signals can become faded due to multipath propagation as the wireless signals are received after bouncing off various surfaces (e.g., walls, floor, ceiling, or other objects). The faded signals can provide inaccuracies in the determined range between the transmitting and receiving devices.

Various techniques can include increasing a rate of transmission of a wireless signal (e.g., an advertising signal). By increasing the rate of transmission by reducing an advertising window, more advertising signals can be transmitted and subsequently received by one or more receiving devices within a given period of time. Various techniques can include reducing the scan interval window for the receiving device. By reducing the scan interval, the time it takes for the receiving device to receive a certain number if wireless signals will be reduced. In various embodiments, both the advertising interval and scan interval can be reduced. These techniques can be known as "boosting" the wireless signal.

As these techniques can result in increased power consumption for the wireless transceivers for the transmitting and receiving devices, certain triggers can be used to let inform either or both the transmitting device and receiving device that a "boosted" state is desired. Once activated, the one or more electronic devices can remain in the "boosted" state for a pre-determined period of time. Following the pre-determined period of time, the electronic devices can return to normal or default communication techniques.

In some aspects, a method can be performed at a first electronic device. The method can include detecting a triggering condition for enabling control of a second electronic device. Upon detection of the triggering condition, the method can include determining an increased rate of transmission of advertising signals of a wireless protocol for transmitting from a wireless transceiver of the first electronic device. The method can include transmitting a plurality of advertising wireless signals at the increased rate using via the wireless protocol. The method can include receiving, from the second electronic device, one or more responses to the advertising wireless signals. The method can include determining a distance measurement based on the one or more responses. Responsive to the distance measurement being less than a threshold value, the method can include enabling control of one or more components of the first electronic device or the second electronic device by the other device.

In some aspects, the advertising wireless signal includes a message causing the second electronic device to increase a scanning rate for the wireless protocol.

In some aspects, the method includes decreasing the rate of transmission of advertising wireless signals after a predetermined time period.

In some aspects, the trigger comprises at least one of a cursor movement, an accelerometer value indicating that the first electronic device or the second electronic device has changed from moving to stationary, and powering on the device within a time threshold.

In some aspects, the control includes one-to-one communications with the second electronic device.

In some aspects, the control includes a one-to-many communications with a plurality of electronic devices.

In some aspects, the method includes decreasing the rate of transmission of advertising wireless signals after determining the distance within a defined probability.

In some aspects, the method further includes determining, at the first electronic device, that the control is selected on first electronic device.

In various embodiments, an electronic device can include one or more memories; and one or more processors in communication with the one or more memories and configured to execute instructions stored in the one or more memories to performing operations of a method described above.

In various embodiments, a computer-readable medium storing a plurality of instructions that, when executed by one or more processors of an electronic device, cause the one or more processors to perform operations of any of the methods described above Reference to the remaining portions of the specification, including the drawings and claims, will realize other features and advantages of embodiments of the present invention. Further features and advantages, as well as the structure and operation of various embodiments of the present invention, are described in detail below with respect to the accompanying drawings. In the drawings, like reference numbers can indicate identical or functionally similar elements.

Other embodiments of the invention are directed to systems, apparatus, and computer readable media associated with methods described herein. In one embodiment, a computer program product comprises a computer readable medium storing a plurality of instructions for controlling a processor to perform an operation for methods described herein. Embodiments are also directed to computer systems configured to perform the steps of any of the methods described herein, potentially with different components performing a respective step or a respective group of steps.

BRIEF DESCRIPTION OF THE DRAWINGS

FIG. 3 illustrates a table indicating range determination time based on various scan windows and scan intervals.

DETAILED DESCRIPTION

Figure 1:
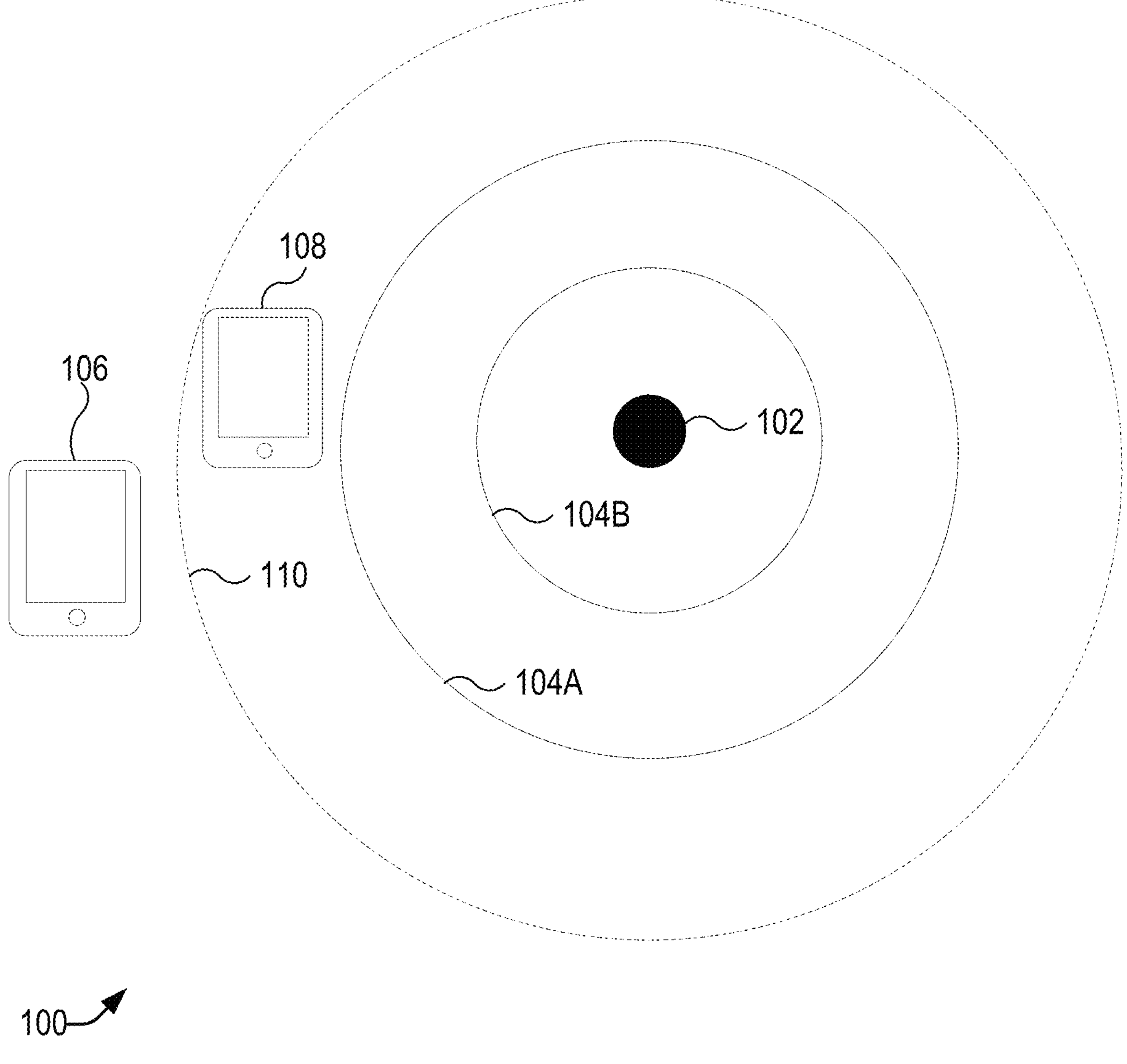
FIG. 1 illustrates a diagram illustrating a transmitter transmitting a wireless signal, a location within the target distance, and a location outside the target distance in accordance with described embodiments.

Certain embodiments are directed to techniques (e.g., a device, a method, a memory or non-transitory computer readable medium storing code or instructions executable by one or more processors) for proximity estimation.

One technique to improve the time to calculating a proximity value is to increase the advertising rate, increase the scan rate or both. As increasing the advertising rate or the scan rate will both increase power consumption, a triggering condition can be used to indicate conditions exists that such proximity detection would be used.

Various applications use a measured proximity to other electronic devices to trigger certain features on those devices. Various wireless protocols (e.g., Bluetooth or BLE) can be used to measure a proximity between two or more electronic devices. In various techniques the RSSI from the wireless signal can be used to determine a range between a transmitting electronic device and a receiving electronic device. The electronic devices may be power constrained, and the wireless protocol may use a scanning and advertising scheme that conserves power for each of the devices. However, the default scanning and advertising scheme rates may not be sufficient to meet expected proximity determination times (e.g., proximity value determined within a few seconds). Due to various propagation paths for the wireless signals between the devices (e.g., multipath propagation and backscatter) the wireless signals can become faded and such effects increase the time to determine a proximity value. Such increased time to determine proximity value can lead to a poor user experience since a user may assume that the feature does not work correctly.

In some aspects, an electronic device may detect a triggering condition of a proximity feature that is enabled on electronic device. Upon detection of the triggering condition, the electronic device may increase a rate of transmission of advertising signals of a wireless protocol. The electronic device can transmit a plurality of advertising wireless signals at a plurality of transmission times at the increased rate using the wireless protocol. The electronic device may receive, from the other device, one or more responses to the advertising wireless signals. The electronic device may determine a distance measurement based on the one or more responses. The electronic device may be responsive to the distance measurement being less than a threshold value, activating the proximity feature on the electronic device. Numerous other aspects are described.

I. Using Received Signal Strength to Calculate Distance

The strength of a wireless signal can be used to determine a distance between a transmitting device and a receiving device. For a wireless signal (e.g., Bluetooth), it is the strength of the beacon's signal as seen on the receiving device, e.g., a mobile device or smartphone. The signal strength depends on distance and Broadcasting Power value. Bluetooth works with broadcasting signals and that broadcasting power value is around 2-4 decibel milliwatts (dBm). Therefor the Bluetooth signal RSSI strength will be around −26 dBm at a few inches to −100 dBm at 40-50 meters distance).

Mobile device manufacturers can define values (e.g., Measured Power) to calculate proximity between two unpaired/paired devices. Due to external factors influencing radio waves—such as absorption, interference, or diffraction—RSSI tends to fluctuate. The further away the device is from the beacon, the more unstable the RSSI becomes.

Measured Power can be a factory-calibrated, read-only constant that indicates what is the expected RSSI at a distance of one (1) meter to the beacon. Combined with RSSI, it can allow the device to estimate the distance between the device and the beacon.

Beacons do not broadcast constantly like Wi-Fi. The transmissions occur in discrete transmission windows. Advertising Interval describes the time between each transmission window. The value of the Advertising Interval can range between 100 milliseconds (ms) and 2000 ms.

FIG. 1 illustrates a network transmitter environment 100 in which a first electronic device 102 acts like a beacon device and intermittently transmits a wireless signal 104. FIG. 1 illustrates a second electronic device 106 at a first location and a third electronic device 108 at a second location. In various embodiments, the second electronic device 106 and/or the third electronic device 108 can emit a wireless signal in addition to the capability to receive the wireless signals. The wireless signal 104 can propagate omni-directionally, the wireless signal 104A can occur at time $t_1$ while the wireless signal 104B can occur at a later time $t_2$.

The first electronic device 102 can also receive wireless signals 104. The second electronic device 106 is located farther from the first electronic device 102 than a target distance 110, while the third electronic device 108 is located closer to the first electronic device 102 than the target distance 110. The first electronic device 102 can include any transmitter that can transmit a wireless signal 104 that can be received by one or more mobile devices or other electronic device (e.g., the second electronic device 106 and the third electronic device 108). The first electronic device 102 may include, but is not limited to, a transmitter that transmits a wireless signal using Bluetooth technology, cellular telephone technology such as a low-power cellular base station (e.g., a femtocell), or ZigBee technology.

The second electronic device 106 and the third electronic device 108 can measure the signal strength of the wireless signal 104. In various embodiments, stored look-up tables can be used to determine a distance based on the measured signal strength. In various embodiments, the distance can be calculated based on the following formula:

$$\text{Distance(meters)}=10\wedge((\text{Measured Power-RSSI})/(10*N)$$

Wherein Measured Power is the 1 Meter RSSI for the wireless transmitter. RSSI is a value measured by the receiving device. N is a constant depending on an environmental factor. Range 2-4 for low to high strength, A target distance 110 can be any target distance measured or signified in any way using any input method. The target distance 110 can be adjustable based on an application. The target distance 110 can be a predetermined value. For example, the target distance can be the distance can be determined for activating one or more features on one or more electronic devices.

The electronic device 102 can convert the target distance 110 into a target wireless signal strength. The target distance 110 can be converted into a target wireless signal strength using any desired process including, but not limited to, a lookup table, a direct measurement of the wireless signal strength at the target distance, or a formula. The target wireless signal strength may be generated for any type of wireless signal that electronic device 102 can receive. For example, if network transmitter environment 100 in electronic device 102 includes networking systems for BLE and ZigBee, then the target wireless signal strength may be determined for both BLE and ZigBee.

The target distance 110 may be converted into a target wireless signal strength on a second electronic device or other device (such as a server that stores the lookup tables) and then transferred to electronic device 102 via any desired mechanism, such as a wired connection, a wireless connection, a memory stick.

Note that the target distance may be generated or entered using any desired method. The target distance may be directly entered into electronic device 102 using a keyboard, keypad, touch screen, or voice recognition, loaded from a file stored on electronic device 102, or programmed into a memory or other circuit in electronic device 102. Additionally, the target distance may be loaded through a wired or wireless connection such as a Bluetooth connection or a network connection to a local area network (LAN) or wide area network (WAN) such as the Internet.

II. Use of Proximity for Adding Control of Other Devices

Proximity determinations can be used as a condition for activating certain features. The wireless transmitter range can extend beyond the confines of a room. For example, a user of a laptop computer may desire to extend the desktop of the display on the laptop computer to extend onto one or more tablet devices. This provides more screen area for the user without the need for an external monitor. The extended screens would allow the cursor of the laptop computer to move between the laptop display and the tablet displays.

In another example the user may want to share information with other users working on other electronic devices (e.g., tablet computers). In this example, the user of the laptop computer can share their display screen with the other tablet computers.

The wireless protocol used for these techniques can extend beyond a distance for which this feature would normally be used. For example, the wireless signal may extend into another room. It would be undesirable for the laptop computer to inadvertently extend with a tablet computer in another room. It would be disconcerting if the cursor disappears off the laptop computer display onto a display for a tablet computer in another room. Therefore, distance can be a condition used to determine whether or not the extension or sharing features would be activated. The RSSI measurement techniques can be used in determining the proximity of the devices.

Figure 2:
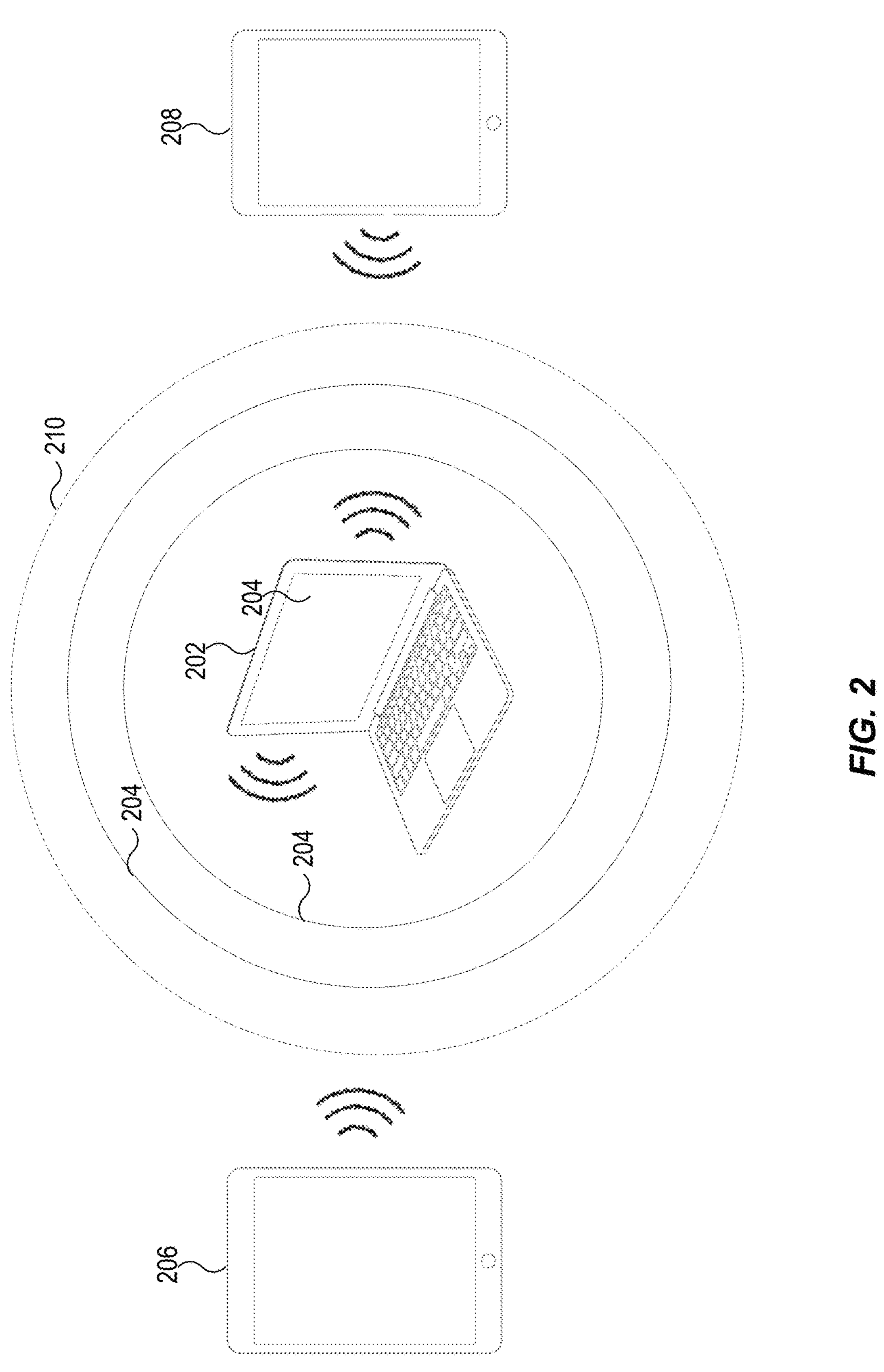
FIG. 2 illustrates a system according to aspects of the disclosure.

FIG. 2 illustrates a system 200 according to aspects of the disclosure. The system 200 can include a first computing device 202. The first computing device 202 can be a tablet computer, a desktop computer, a laptop computer, or a network terminal. In certain circumstances, the first computing device 202 can electronically mirror or extend the display 204 onto one or more mobile devices 206. The one or more mobile devices 206 can be one of a laptop computer, a tablet computer, a smartphone, and a wearable device (e.g., an electronic watch or electronic glasses). Certain features can allow universal control of the one or more mobile devices 206 through the first computing device 202. The feature to electronically mirror or extend the display 204 can function after one or more triggering conditions has been achieved. One such triggering condition can be a proximity value for one or more of the one or more mobile devices 206 and the first computing device 202 being within a predetermined threshold range. While only two mobile devices 206 are illustrated in FIG. 2, the disclosed techniques can be used for one mobile device 206 or greater than two mobile devices 206. The features to electronically mirror or extend the display 204 onto one or more mobile devices 206 is described in U.S. application Ser. No. 14/641,298, published as US 2015-0350297 A1 and U.S. Pat. No. 11,256,294 entitled "Continuity" which is incorporated by reference herein in its entirety and for all purposes.

In various embodiments, the triggering condition can create an ad hoc network protocol to establish one-to-one communications. In various embodiments, the ad hoc network can be created for proprietary devices.

In various embodiments, universal control can mean one electronic device having full or partial control of one or more second electronic devices. For example, this can mean a first computing device 202 (e.g., a laptop computer) controlling a display of one or more mobile devices 206 (e.g., table computers). In another example, the proximity detection feature can be used for web conferencing. In that example, a user may want to use a mobile device 206 (e.g., a tablet or smartphone device) for its camera and/or microphone to conduct a video conference using the first computing device 202. The proximity feature can be used to determine when the mobile device 206 is within a range of the first computing device 202.

Multiple techniques can be employed to determine a range between the first computing device 202 and one or more of the one or more mobile devices 206 (e.g., peer to peer ranging techniques). Various peer to peer ranging techniques (e.g., ultra-wide band (UWB) ranging) can be power intensive and can consume battery power especially from the one or more mobile devices 206. Wireless communication techniques (e.g., Bluetooth, Bluetooth Low Energy (BLE), etc.) can be used to determine the range between the devices. However, the wireless communication techniques can have default advertising and scanning schemes that may not support a predetermined time for range determination. Range determination delays may provide the false impression that the feature is not working and may result in a poor user experience. Another undesirable user experience can be inadvertent entering of a universal control or extended mode by a first user in one room with a device in a second room just because the first user moved their cursor to the side of the screen that triggered this experience. Proximity between the devices can be determined as a threshold to enter into universal control or extended mode. Techniques described herein improve range calculation time while minimizing the impact of increased power consumption.

In addition to proximity, other conditions may need to be satisfied to enter universal control or extended mode. In various embodiments, both devices would need to be paired using the same identifier credentials.

III. Time Intervals for Range Determination

FIG. 3 illustrates a table 300 indicating range determination time based on various scan windows and scan intervals. Each of the rows can illustrate a change to one or more of scan window/scan interval 302 and advertising interval 304 to determine the effect on the range calculation time 306. In a first column, various scan window and scan intervals 302 combinations are listed. A scan window specifies a time in which a device listens for advertisements and optionally requests scan records. A scan interval defines the time between two consecutive scan windows. In the advertising state, a device can send out packets containing useful data for others to receive and process. The packets are sent at an interval defined as the Advertising Interval.

A first row 308 of FIG. 3 can illustrate default settings. As illustrated in the first column, a default scan window 302 can be N milliseconds (ms) where Nis an integer value (e.g., 15, 30, 60). A default scan interval can be N times 10 ms. The default scan window and the default scan interval represent a 10% duty cycle. This means that the device can scan for N ms of a total of N*10 ms resulting in N*9 ms of not scanning. In a second column, the advertisement interval 304 can be listed. As shown in the second column, the default advertising interval 304 can be N*9 ms. In a third column, the range calculation time 306 can be listed. A range calculation time estimate can be defined as a predetermined percentile (e.g., 95th percentile) of time to receive a predetermined number of samples (e.g., 8 samples).

In various embodiments, the samples are received on a plurality of channels (e.g., 3 channels). A plurality of channels can be used for determining range estimate due to fading of the wireless signal. The fading can result in an indication of a proximity closer than the actual proximity. The fading can be a result of the receiver detecting not only line-of-sight wireless signals but also multi-path propagation (e.g., signals that have bounced off walls, ceiling, floors, or other objects). The line-of-sight signals can combine with the multi-path propagation that can reduce signal strength through destructive interference of the wireless signals. Part of the range determination can involve determining that wireless signals are likely faded, and if the wireless signal is determined to likely be faded it will not be used in the range determination. When a plurality of channels is used, the proximity estimate can be more accurate than use of a single channel. Therefore, current techniques using multiple channels wait until samples are received on all of the channels before a proximity distance is determined.

The range calculation time can be identified in the third column, the time can be a range between 30 and 40 seconds. In various aspects, consumers may expect the time to be within an expected time (e.g., less than two seconds). Therefore, the default scan window and scan interval may not provide user expectations.

A second row 310 of FIG. 3 illustrates a first modification of the default settings. In the first modification, the scan interval is reduced to N*3 ms. The adverting interval for the first modification is N*9 ms. The range calculation time estimate for the first modification can be a range of 10-15 seconds.

A third row 312 of FIG. 3 illustrates a second modification of the default settings. In the second modification, the scan window is reduced to N ms. The adverting interval for the second modification is N ms. The range calculation time estimate for the first modification can be 3-6 seconds.

A fourth row 314 of FIG. 3 illustrates a third modification of the default settings. In the third modification, the scan interval is reduced to N*3 milliseconds (ms), and the scan window is reduced to N ms. The adverting interval for the second modification is N ms. The range calculation time estimate for the first modification can be 1-2 seconds.

Other configurations of scan interval, scan window, and advertising interval can be considered to optimize the range calculation time estimate. However, there is a power use penalty that results from reducing the scan interval and advertising interval so it should not be performed all the time. The electronic devices can detect one or more triggering conditions to indicate that the devices may be in a condition for calculating a range estimate so the modifications to at least one or more of scan interval, scan window, and advertising interval can be made at that time.

IV. Triggering Conditions

A triggering condition can help inform the electronic device that conditions may exist for a range determination. The triggering conditions can take several forms. In an example of a triggering condition, the user of the computing device 202 can bump a cursor against an edge of the display screen. Another example of a triggering condition can be a mobile device being in motion and coming to rest. Another example of a triggering condition can be a mobile device being powered up or being woken up from a sleep mode. Another example of a triggering condition can be a selection of a feature by the user of the computing device 202 that indicates a desire to activate one or more special features. Different functionalities can be assigned different triggering conditions. In addition, some of the triggering conditions may be the same across different features. In various embodiments, the features need to be selected (e.g., turned on) prior to the triggering condition executing a specific action.

The disclosed techniques can use accelerometer and gyroscope measurements to determine whether the one or more mobile devices are moving or are stationary. One condition to trigger the modified condition is to detect when the one or more mobile devices transition from a moving condition to a stationary condition. For example, a user can walk around with a tablet computer in a vicinity of a laptop computer. The user can put the tablet computer down in a vicinity of the laptop computer. It would be desirable to detect when the one or more mobile devices (e.g., the tablet computers) are stationary for a predetermined period of time. The electronic device can detect a triggering condition when the tablet computer has been stationary for the predetermined period of time.

In various embodiments, the motion detection can be paused at that point for a given period of time (e.g., the next 60 seconds). This would be done to effectively prevent continuous double-boost triggers from happening. If a user is holding a mobile device in their hands, the user could transition from a moving motion state to a stationary state, and back and forth several times in a specific period of time. A goal can be to avoid continuously triggering in these situations because of the excessive power consumption when in a boosted state. In various embodiments, if the mobile devices plan for a back off period where in which the mobile device will pause every time the accelerometers detect a change to a stationary state. The pause can be for a pre-determined period of time (e.g., 60 seconds). During the paused period, the mobile device will not be able to create any motion detector triggers until that 60-second timer goes away.

In other conditions when the screen is off, effectively, the one or more mobile devices can reset this timer. The motion detection can also be paused during this period of time.

And then in terms of power consumption, by basically reducing the update rate of how quickly the one or more mobile devices receive measurements from the accelerometer, the one or more mobile devices can decrease the amount of power that can be required in order to run this motion detector. This can be important because this can be running whenever the screen is on currently. If the one or more mobile devices run at a really high update rate, 100 Hz the whole time, the one or more mobile devices can burn a significant amount of CPU cycles kind of servicing and running this motion detector. Therefore, an additional power saving feature can be reducing the update rate of it down to 10 Hz from 100 Hertz (Hz) to greatly improve on the amount of CPU usage that it uses.

A. Communication Between Triggered Device and Untriggered Device

Figure 4:
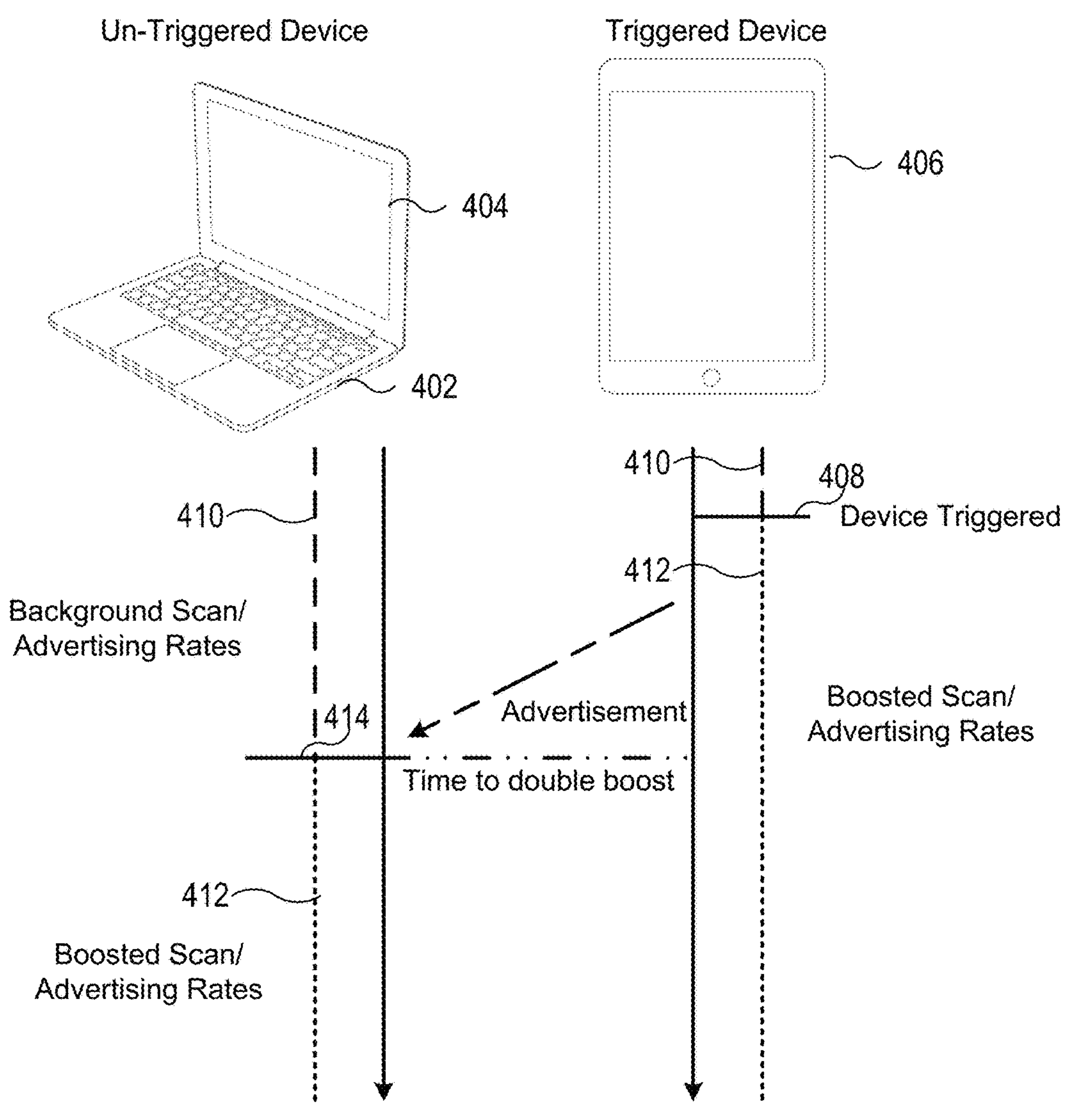
FIG. 4 illustrates a flow for techniques according to aspects of the disclosure.

FIG. 4 illustrates a flow 400 for techniques according to aspects of the disclosure. A first computing device 402 can be a tablet computer, a desktop computer, a laptop computer, or a network terminal. In certain circumstances the first computing device 402 can electronically mirror or extend the display 404 onto one or more mobile devices 406. The one or more mobile devices 406 can be a tablet computer.

In one example, the mobile device 406 can be triggered at a first time 408 following a triggering condition. In one non-limiting example, the triggering condition can be the mobile device moving and then stationary for a predetermined period of time. An accelerometer in the mobile device 406 can be used to determine motion for the mobile device 406. In the example, the mobile device 406 can transmit Bluetooth advertisements that can be received by the first computing device 402.

Prior to the first time 408, the mobile device can be operating the wireless transmitter under normal operating conditions. The normal operating conditions can include the default scan rate and/or a default advertising rate.

Following the triggering condition, the mobile device 406 can enter a modified state for wireless transmissions. The modified state 412 can include boosting the scan rates. The modified state 412 can include boosting the advertising rates. The modified state 412 can include boosting both the scan rates and the advertising rates.

In various embodiments, the advertising interval can be decreased from 270 ms to 30 ms. The reduction in advertising interval can product more advertising messages being transmitted in a given period of time. The advertising messages can include information for the first computing device to enter into a modified state 412. The modified state 412 can last for a predetermined time period. The modified state 412 can list until a second triggering condition is received.

At a second point 414, the first computing device 402 can receive the advertising message. One or more electronic devices can receive the advertising message. The advertising message can include information for the first computing device 402 to enter into the modified state 412. In various embodiments, the information in the advertising message is encrypted. In various embodiments, the receiving device for the advertising messages would need to first decrypt the advertising message. In various embodiments, the receiving device would need to have the same identifier credentials as the transmitting device. In various embodiments, multiple mobile devices can enter the modified state upon receipt of the advertising message. The modified state 412 can last for a predetermined time period. The modified state 412 can list until a second triggering condition is received.

In various embodiments, the first computing device 402 can determined a range from the first computing device using the received signal strength indication (RSSI) of the wireless signal sent from the mobile device 406. In various embodiments, the one or mobile devices 406 can determined a range from the first computing device 402 using the received signal strength indication (RSSI) of the wireless signal sent from the first computing device 402.

In various embodiments, the one or more mobile devices within a threshold distance will prompt a user to receive authorization to enter into a universal control or display extension modes. Each of the first computing device and the one or more mobile devices 406 can independently negotiate a one-to-one or one-to-many communication connections. In various embodiments, the one-to-one or one-to-many communication connections can be formed using a wireless protocol. In various embodiments, the wireless protocol can be Bluetooth protocol.

B. Using RSSI Plot to Detect Fading Channels

As previously discuss, RSSI can vary based distance, orientation, broadcasting power, and location with respect to other services. Several measurements can be made of the signal over time and using different channels in order to obtain a more accurate and reliable distance measurement. A technique to mitigate the effects of interference is to divide radio spectral band into sub-ranges called channels and assign different channels to different subsets of nodes in a network. In various embodiments, the channels can be orthogonal such that the different channels do not interfere with each other. BLE can include 40 channels with 2 Megahertz (MHz) spacing with 3 advertising channels. Channels 37 (2402 MHz), Channel 38 (2426 MHz) and Channel 39 (2480 MHz) are the designated advertising channels for BLE. These channels were selected to minimize interference from Wi-Fi channels.

Figure 5:
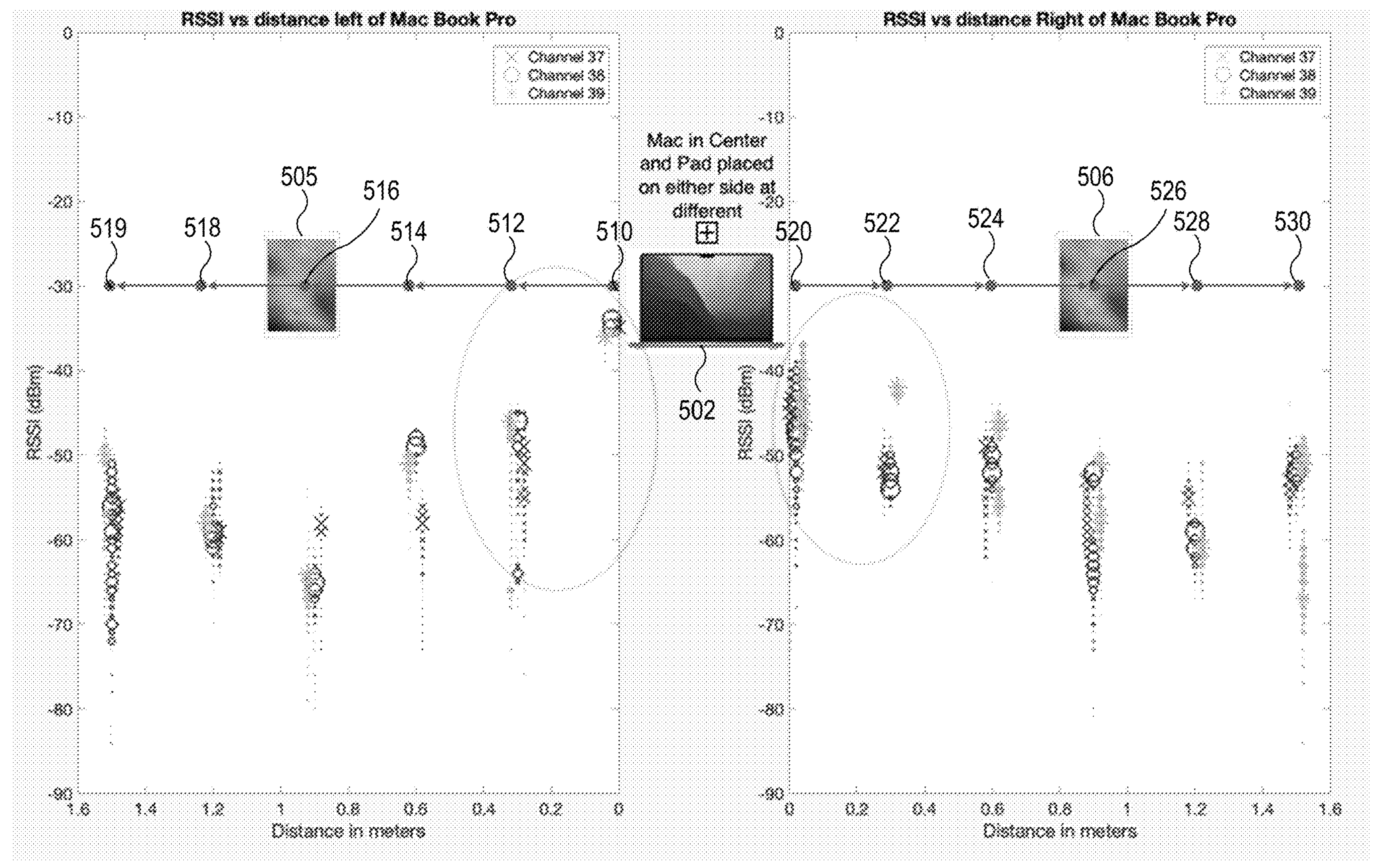
FIG. 5 illustrates a plot of received signal strength indicator versus distance from an electronic device.

FIG. 5 illustrates a plot 500 of received signal strength indicator versus distance from an electronic device. As illustrated in FIG. 5, some channels can be faded, but the use of multiple channels can offset the effects this fading. FIG. 5 illustrated a first computing device 502 and a first mobile device 505 and a second mobile device 506.

FIG. 5 illustrates a plot 500 of RSSI (measured in dBm) at a first distance 510 (0 meters on left side of the first computing device 502). FIG. 5 illustrates a plot 500 of RSSI (measured in dBm) at a first distance 520 (0 meters on right side of the first computing device 502). The plot 500 includes received data for three channels (e.g., Channel 37, Channel 38, and Channel 39). The plot 500 also shows measurements taken at a plurality of points to the left of the first computing device 502. For example, the measurements can be taken at a second position 512, a third position 514, a fourth position 516, a fifth position 518, and a sixth position 519. The plot 500 also shows measurements taken at a plurality of points to the right of the first computing device 502. For example, the measurements can be taken at a second position 522, a third position 524, a fourth position 526, a fifth position 528, and a sixth position 530.

As an example, Channel 39 does not appear to be a faded channel based on the close groupings of the multiple signals for that channel. However, both Channel 37 and Channel 38 show signs of being faded based on the decrease in signal strength and the spread of the multiple signals for that channel.

V. Flowchart for Process for Estimating Proximity

Figure 6:
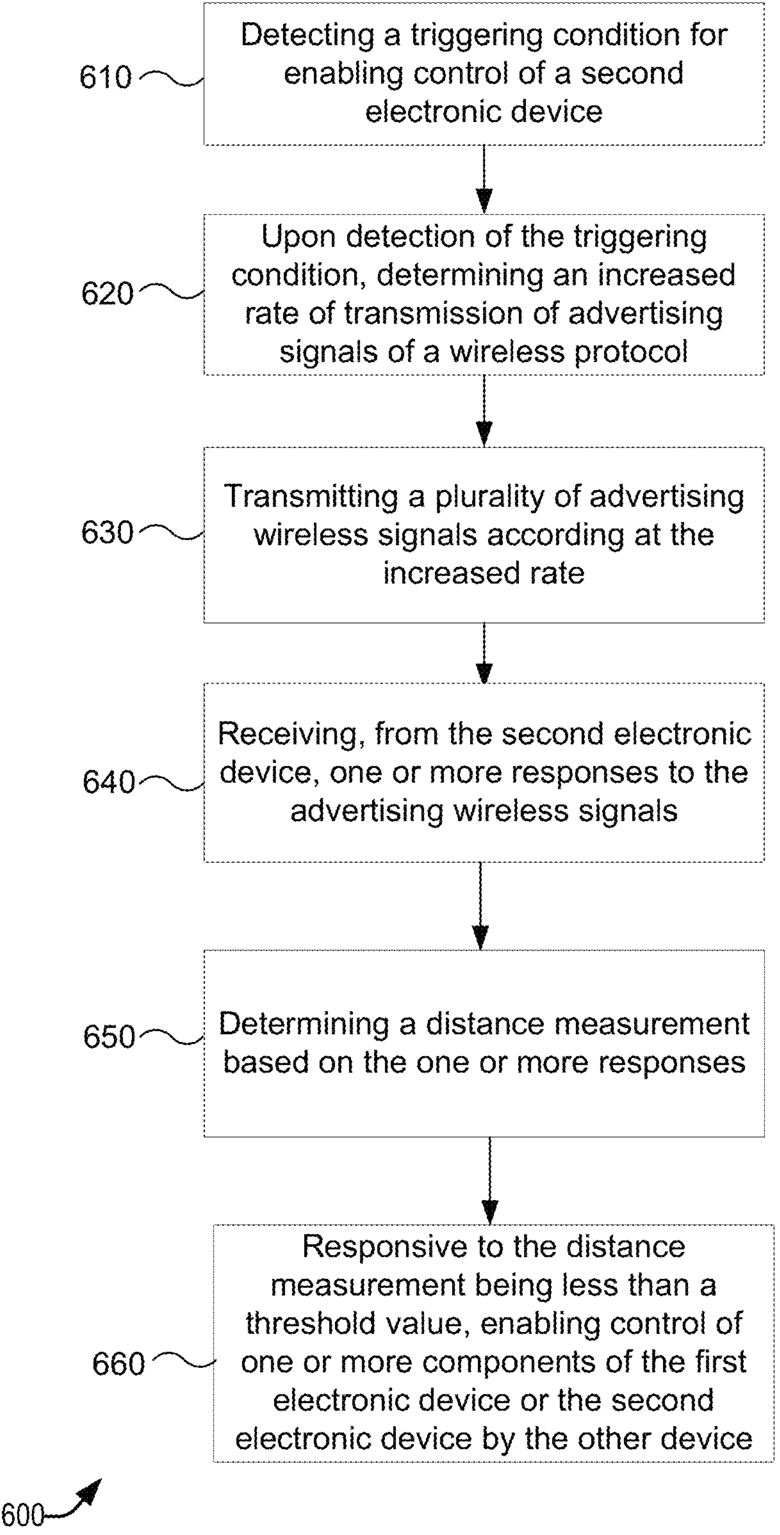
FIG. 6 illustrates a flowchart for a technique for reducing range determination time for an electronic device.

FIG. 6 is a flowchart of an example process 600 associated with system and techniques for proximity estimation for universal control. In some implementations, one or more process blocks of FIG. 6 may be performed by an electronic device (e.g., electronic device 1000). Additionally, or alternatively, one or more process blocks of FIG. 6 may be performed by one or more components of device 1000, such as processor 1018, memory 1002, input/output component 1006, and/or wireless circuitry 1008.

At block 610, process 600 may include detecting a triggering condition for enabling control of a second electronic device. For example, the electronic device may detect a triggering condition for enabling control of the second electronic device, as described above.

In various implementations, the trigger comprises at least one of a cursor movement, an accelerometer value indicating that the first electronic device or the second electronic device has changed from moving to stationary, and powering on the device within a time threshold.

The triggering conditions can take several forms. In a first triggering condition, the user of the computing device can bump a cursor against an edge of the display screen. A second triggering condition can be a mobile device or a computing device being in motion and coming to rest. A third triggering condition can be a mobile device being powered up or being woken up from a sleep mode. A fifth triggering condition can be a selection of a feature by the user of the computing device that indicates a desire to activate one or more special features. Different functionalities can be assigned different triggering conditions. In addition, some of the triggering conditions may be the same across different features. In various embodiments, the features need to be selected (e.g., turned on) prior to the triggering condition executing a specific action.

The triggering condition can be detected via one or more sensors. For example, for a triggering condition based on a motion of the device data from the accelerometer may be used. Various triggering condition s can be based on movement of a cursor on a device.

At block 620, upon detection of the triggering condition, process 600 may include determining an increased rate of transmission of advertising signals of a wireless protocol for transmitting from a wireless transceiver of the first electronic device. The effect of increasing the advertising signals is to decrease the time required to determine a range between the electronic devices. In various embodiments, the increased rate of transmission can be predetermined.

In various embodiments, the wireless protocol can be Bluetooth. In various embodiments, the wireless protocol can be BLE.

In various embodiments, detecting the triggering condition may be based on receiving information in an advertising signal. In various embodiments, the information can be encrypted and the process 600 can include decrypting the information in the advertising signal.

In various embodiments, increasing the rate of transmission of the advertising signals of the wireless protocol can include decreasing the advertising interval. In various embodiments, the advertising interval can be decreased from a default value. In various embodiments, the advertising interval can be decreased from 270 ms to an advertising interval of 30 ms.

At block 630, process 600 may include transmitting a plurality of advertising wireless signals at the increased rate using via the wireless protocol. For example, the electronic device may transmit a plurality of advertising wireless signals at a plurality of transmission times at the increased rate using the wireless protocol, as described above.

In various implementations, the advertising wireless signal includes a message causing the one or more other devices to increase a scanning rate for the wireless protocol. In various embodiments, the message can indicate the desired scanning rate or a selection of a predetermined scanning rate.

At block 640, process 600 may include receiving, from the second electronic device, one or more responses to the advertising wireless signals. For example, the electronic device may receive, from the second electronic device, one or more responses to the advertising wireless signals, as described above. The responses can be received by the wireless transmitter of the first electronic device.

In various embodiments, the second electronic device can include one of a laptop computer, a notebook computer, a tablet computer, and a smartphone. In various embodiments, the one or more responses may include information regarding the other device. In various embodiments, the information from the other device may be encrypted.

At block 650, process 600 may include determining a distance measurement based on the one or more responses. For example, the electronic device may determine a distance measurement based on the one or more responses, as described above. In various embodiments, a RSSI from the responses to the advertising signal can correspond to a distance. In various embodiments, a plurality of responses can be received on multiple channels. In various embodiments, look-up tables can be used to correlate the signal strength to a distance. In various embodiments, the distance measurement can be determining by measuring a time of flight (TOF) of the wireless signals.

At block 660, responsive to the distance measurement being less than a threshold value, process 600 may include enabling control of one or more components of the first electronic device or the second electronic device by the other device. In various embodiments, the control can include universal control. In various embodiments, the control can include extending a display of the computing device. In various embodiments, the control can include screen sharing.

Process 600 may include additional implementations, such as any single implementation or any combination of implementations described below and/or in connection with one or more other processes described elsewhere herein.

In various embodiments, process 600 can include at least one of the plurality of advertising wireless signals includes a message causing the second electronic device to increase a scanning rate for the wireless protocol. In various embodiments, but the transmission rate can be increased for the first electronic device and the scanning rate can be increased for the second electronic device.

In various implementations, process 600 can include decreasing the rate of transmission of advertising wireless signals after a predetermined time period. Due to power constraints of the electronic devices, the electronic devices will return to normal or default advertising rates. This can be accomplished by increasing the advertising window. By increasing the adverting window, the power consumption can be reduced as less transmissions will be made within a given period of time. Less advertising signals can be transmitted and subsequently received by one or more receiving devices within a given period of time. Various techniques can include increasing the scan interval window for the receiving device. By increasing the scan interval, the power consumption for the electronic device will be reduced, but the time it takes for the receiving device to receive a certain number if wireless signals will be increased. In various embodiments, both the advertising interval and scan interval can be increased.

In various implementations, the control includes one-to-one communications with a second electronic device. The one-to-one communication mode can include universal control of the second electronic device. Proximity determinations can be used as a condition for activating the one-to-one communication mode. For example, the one-to-one communication mode can include extending the desktop of the display on the laptop computer to extend onto one or more local tablet devices. This extension provides more screen area for the user without the need for an external monitor. The extended screens would allow the cursor of the laptop computer to move between the laptop display and the tablet displays.

In various implementations, the control includes one-to-many communications with a plurality of electronic devices. The one-to-many communications can include extending screens or screen sharing as discussed below.

In another example the one-to-one communication mode can include the laptop computer sharing the screen of the laptop computer with other users working on other electronic devices (e.g., tablet computers). In this example, the user of the laptop computer can share their display screen with the other tablet computers. In various implementations, the proximity feature allows the electronic device to be in a one-to-many communication mode with a plurality of electronic devices. For example, the laptop computer can extend the display with a first tablet computer to the left of the laptop computer and a second tablet computer to the right of the laptop computer. In various embodiments, the screen sharing feature can duplicate the information displayed on multiple tablet computers in one-to-one communication mode with the computing device.

In various implementations, process 600 includes decreasing the rate of transmission of advertising wireless signals after determining the distance within a defined probability. The electronic device can receive multiple signals from a transmitting device. This can include receiving multiple advertising signals using different channels. The electronic device can measure the RSSI from the various wireless signals and can calculate a probability of the determined distance being accurate. The probability determination can consider an average of the measured RSSI signals. In various embodiments, the measured values for faded channels can be discounted and not used in determining the probability. After the electronic device has calculated the distance within a predetermined value, the boosted signal may no longer be required. The electronic device can return to default wireless transmission properties from the boosted rate as to reduce the power consumption of the electronic device.

In various implementations, process 600 includes determining, at an electronic device, that a control feature is selected on electronic device. In various embodiments, the proximity features can be selectively activated and de-activated on the electronic device. This activation/de-activation can be done through an electronic switch or soft switch. The activation/de-activation value can be checked prior to execution of a boosted condition to avoid expending addition power for the electronic device (e.g., if the electronic device is in a low power mode).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
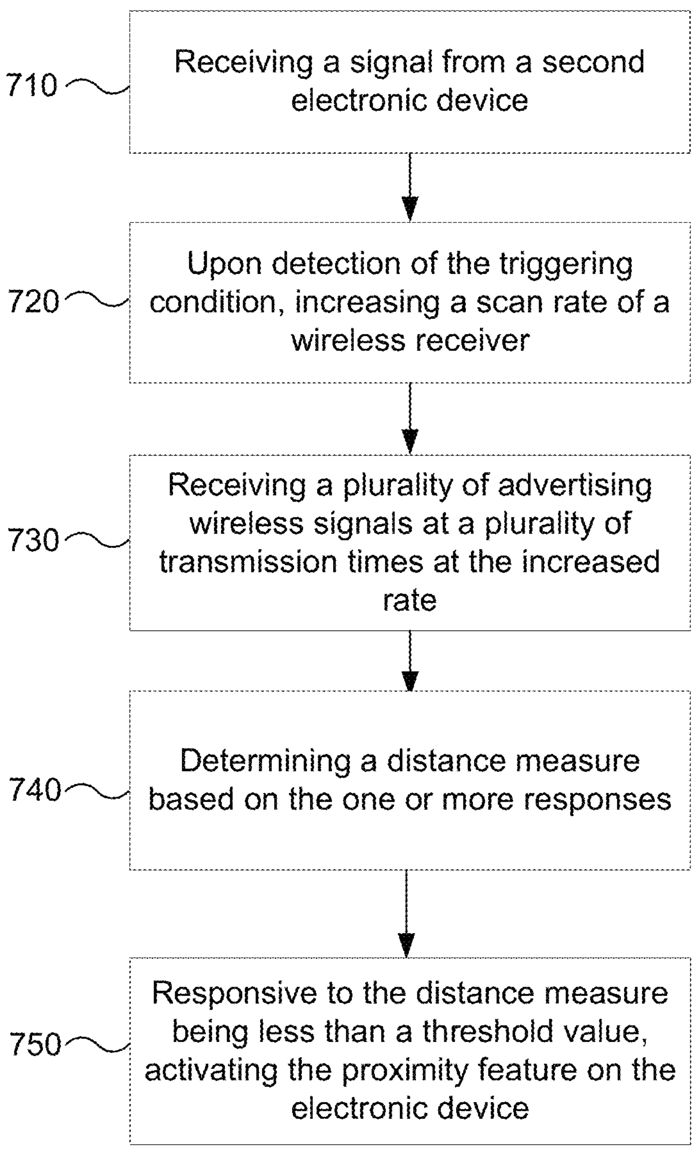
FIG. 7 illustrates a second flowchart for a technique for reducing range determination time for an electronic device.
Figure 7:
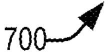

FIG. 7 is a flowchart of an example process 700 associated with system and techniques for proximity estimation for universal control. In some implementations, one or more process blocks of FIG. 7 may be performed by a first electronic device (e.g., electronic device 1000). Additionally, or alternatively, one or more process blocks of FIG. 7 may be performed by one or more components of device 1000, such as processor 1018, memory 1002, input/output component 1006, and/or wireless circuitry 1008.

At block 710, process 700 may include receiving a signal from a second electronic device at the first electronic device. The signal can be an advertising signal from a wireless protocol (e.g., Bluetooth or BLE). In various implementations, the advertising wireless signal includes a message causing the one or more other devices to increase a scanning rate for the wireless protocol. The advertising signal can include information to cause the electronic device to enter into a "triggered mode." A processor from the electronic device can process the information from the advertising signal and cause the electronic device to perform various operations.

At block 720, upon receipt of the signal from the second electronic device, process 700 may include increasing a scan rate of a wireless receiver for the first electronic device. By increasing the scan rate for the first electronic device, the scan interval can effectively be reduced. By increasing the scan rate, the first electronic device can receive more advertising signals within a given period of time. By increasing the scan rate the first electronic device can obtain a threshold number of signals faster than default scan rates. This will reduce the time for the first electronic device to calculate a range to the second electronic device. In various embodiments, the wireless protocol can be Bluetooth. In various embodiments, the wireless protocol can be BLE. In various embodiments, the scan interval can be decreased from a default value. In various embodiments, the scan interval can be decreased from 300 ms to a scan interval of 30 ms.

In various embodiments, information in the advertising signal can be encrypted and the process 700 can include decrypting the information in the advertising signal.

In various embodiments, process 700 can include the first electronic device transmitting an advertising signal. In various embodiments, process 700 can include increasing the rate of transmission of the advertising signals of the wireless protocol thereby decreasing the advertising interval. In various embodiments, the advertising interval can be decreased from a default value. In various embodiments, the advertising interval can be decreased from 270 ms to an advertising interval of 30 ms.

In various embodiments, the first electronic device can both decrease the scan interval and the advertising interval.

At block 730, process 700 may include receiving a plurality of advertising wireless signals at a plurality of transmission times at the increased rate using the wireless protocol. For example, the first electronic device may receive a plurality of advertising wireless signals at a plurality of transmission times at the increased rate using the wireless protocol, as described above.

In various embodiments, process 700 can include transmitting a plurality of advertising wireless signals at a plurality of transmission times at the increased rate using the wireless protocol. For example, the first electronic device may transmit a plurality of advertising wireless signals at a plurality of transmission times at the increased rate using the wireless protocol, as described above.

In various embodiments, process 700 may include receiving, from the other device, one or more responses to the advertising wireless signals. For example, the electronic device may receive, from the other device, one or more responses to the advertising wireless signals, as described above.

In various embodiments, the other device can include one of a laptop computer, a notebook computer, a tablet computer, and a smartphone. In various embodiments, the one or more responses may include information regarding the other device. In various embodiments, the information from the other device may be encrypted.

At block 740, process 700 may include determining a distance measurement based on the one or more wireless signals. For example, the electronic device may determine a distance measurement based on the one or more advertising signals, as described above. In various embodiments, a RSSI from the responses to the advertising signal can correspond to a distance. In various embodiments, a plurality of responses can be received on multiple channels. In various embodiments, look-up tables can be used to correlate the signal strength to a distance.

At block 750, process 700 may include responding to the distance measurement being less than a threshold value, activating the proximity feature on the electronic device. For example, the electronic device may be responsive to the distance measurement being less than a threshold value, activating the proximity feature on the electronic device, as described above. In various embodiments, the feature can include universal control. In various embodiments, the feature can include extending a display of the computing device.

Process 700 may include additional implementations, such as any single implementation or any combination of implementations described below and/or in connection with one or more other processes described elsewhere herein.

In various implementations, process 700 can include reducing the scan interval window for the first electronic device after a predetermined time period. By increasing the scan interval, the power consumption for the first electronic device will be reduced, but the time it takes for the receiving device to receive a certain number if wireless signals will be increased.

In various implementations, process 700 can include decreasing the rate of transmission of advertising wireless signals after a predetermined time period. Due to power constraints of the electronic devices the electronic devices will return to normal or default advertising rates. This can be accomplished by increasing the advertising window. By increasing the adverting window, the power consumption can be reduced as less transmissions will be made within a given period of time. Less advertising signals can be transmitted and subsequently received by one or more receiving devices within a given period of time. Various techniques can include both the advertising interval and scan interval can be increased.

In various implementations, the proximity feature allows the electronic device to be in a one-to-one communication mode with a second electronic device. The one-to-one communication mode can include universal control of the second electronic device. Proximity determinations can be used as a condition for activating the one-to-one communication mode. For example, the one-to-one communication mode can include extending the desktop of the display on the laptop computer to extend onto one or more local tablet devices. This extension provides more screen area for the user without the need for an external monitor. The extended screens would allow the cursor of the laptop computer to move between the laptop display and the tablet displays.

In another example the one-to-one communication mode can include the laptop computer sharing the screen of the laptop computer with other users working on other electronic devices (e.g., tablet computers). In this example, the user of the laptop computer can share their display screen with the other tablet computers. In various implementations, the proximity feature allows the electronic device to be in a one-to-many communication mode with a plurality of electronic devices. For example, the laptop computer can extend the display with a first tablet computer to the left of the laptop computer and a second tablet computer to the right of the laptop computer. In various embodiments, the screen sharing feature can duplicate the information displayed on multiple tablet computers in one-to-one communication mode with the computing device.

In various implementations, process 700 includes decreasing the rate of transmission of advertising wireless signals after determining the distance within a defined probability. The electronic device can receive multiple signals from a transmitting device. This can include receiving multiple advertising signals using different channels. The electronic device can measure the RSSI from the various wireless signals and can calculate a probability of the determined distance being accurate. The probability determination can consider an average of the measured RSSI signals. In various embodiments, the measured values for faded channels can be discounted and not used in determining the probability. After the electronic device has calculated the distance within a predetermined value, the boosted signal may no longer be required. The electronic device can return to default wireless transmission properties from the boosted rate as to reduce the power consumption of the electronic device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

VI. Mobile Device for Ranging

Figure 8:
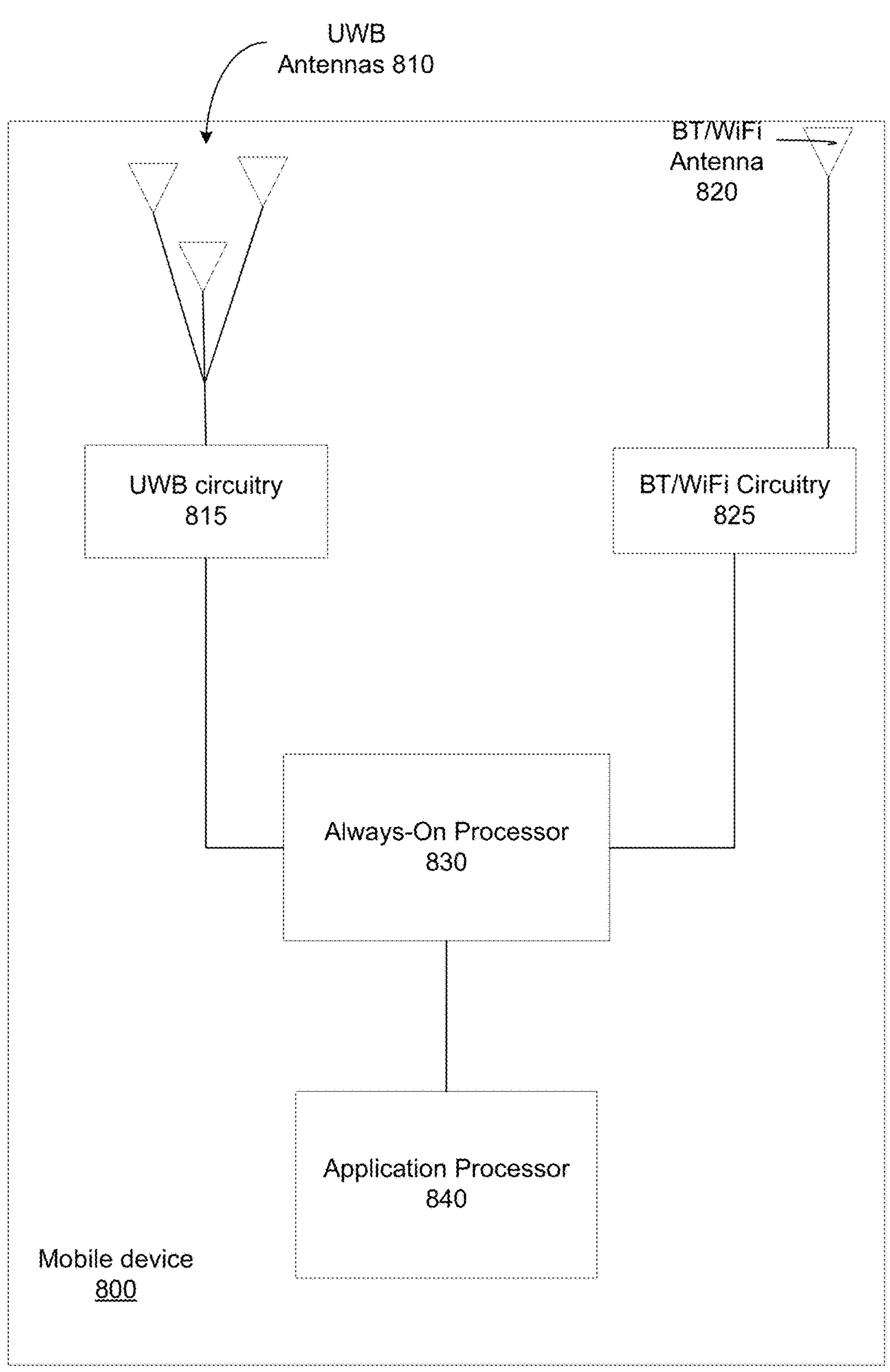
FIG. 8 is a block diagram of components of a mobile device operable to perform ranging according to embodiments of the present disclosure.

FIG. 8 is a block diagram of components of a mobile device 800 operable to perform ranging according to embodiments of the present disclosure. Mobile device 800 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 800 includes UWB antennas 810 for performing ranging. UWB antennas 810 are connected to UWB circuitry 815 for analyzing detected signals from UWB antennas 810. In some embodiments, mobile device 800 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 815 can communicate with an always-on processor (AOP) 830, which can perform further processing using information from UWB messages. For example, AOP 830 can perform the ranging calculations using timing data provided by UWB circuitry 815. AOP 830 and other circuits of the device can include dedicated circuitry and/or configurable circuitry, e.g., via firmware or other software.

As shown, mobile device 800 also includes Bluetooth (BT)/Wi-Fi antenna 820 for communicating data with other devices. BT/Wi-Fi antenna 820 is connected to BT/Wi-Fi circuitry 825 for analyzing detected signals from BT/Wi-Fi antenna 820. For example, BT/Wi-Fi circuitry 825 can parse messages to obtain data (e.g., an authentication tag), which can be sent on to AOP 830. In some embodiments, AOP 830 can perform authentication using an authentication tag. Thus, AOP 830 can store or retrieve a list of authentication tags for which to compare a received tag against, as part of an authentication process. In some implementations, such functionality could be achieved by BT/Wi-Fi circuitry 825.

In other embodiments, UWB circuitry 815 and BT/Wi-Fi circuitry 825 can alternatively or in addition be connected to application processor 840, which can perform similar functionality as AOP 830. Application processor 840 typically requires more power than AOP 830, and thus power can be saved by AOP 830 handling certain functionality, so that application processor 840 can remain in a sleep state, e.g., an off state. As an example, application processor 840 can be used for communicating audio or video using BT/Wi-Fi, while AOP 830 can coordinate transmission of such content and communication between UWB circuitry 815 and BT/Wi-Fi circuitry 825. For instance, AOP 830 can coordinate timing of UWB messages relative to BT advertisements.

To perform ranging, BT/Wi-Fi circuitry 825 can analyze an advertisement signal from another device to determine that the other device wants to perform ranging, e.g., as part of a process for sharing content. BT/Wi-Fi circuitry 825 can communicate this notification to AOP 830, which can schedule the UWB circuitry 815 to be ready to detect UWB messages from the other device.

For the device initiating ranging, its AOP can perform the ranging calculations. Further, the AOP can monitor changes in distance between the other devices. For example, AOP 830 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VII. Example Device

Figure 9:
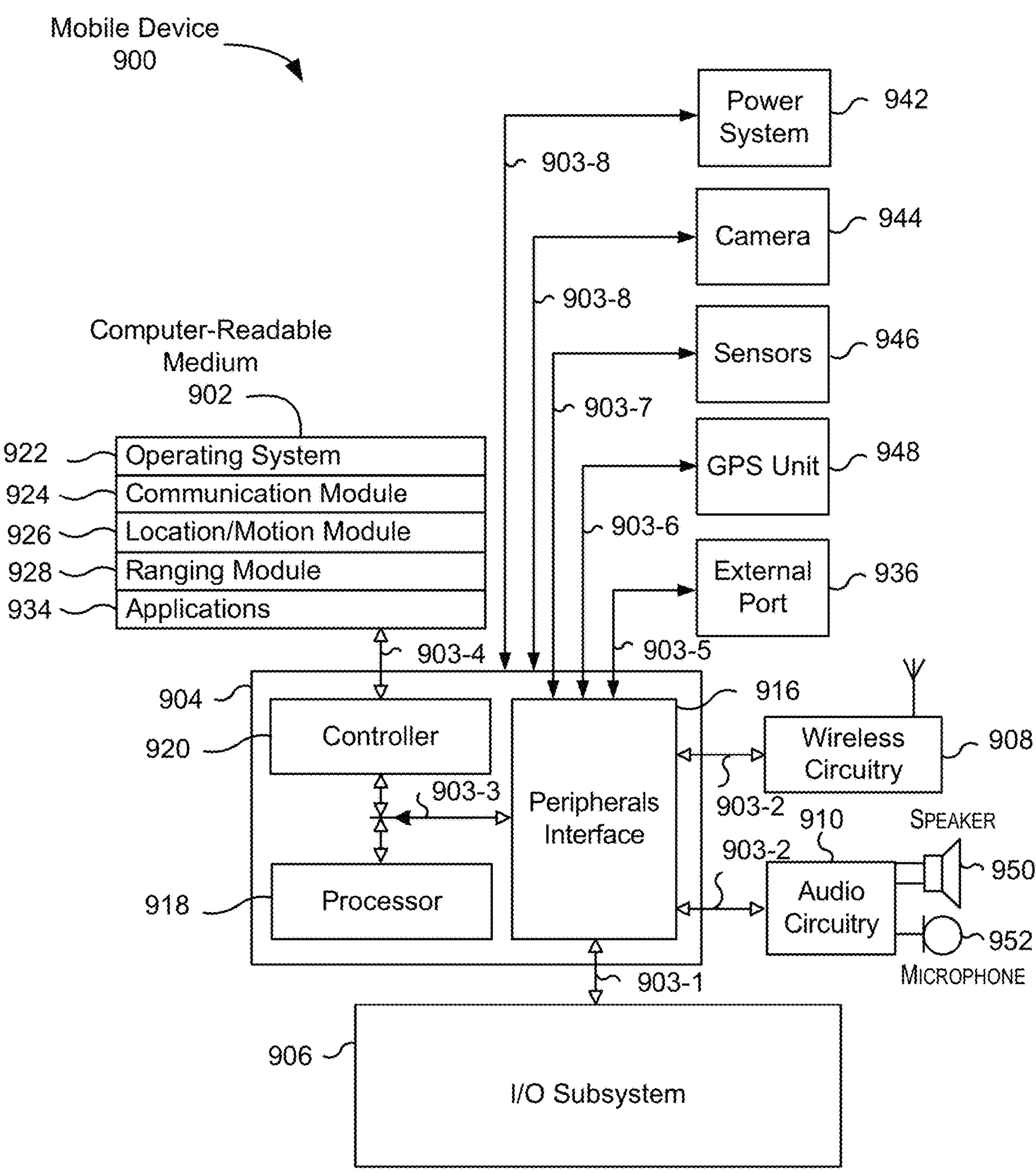
FIG. 9 is block diagram of an example device according to embodiments of the present disclosure.

FIG. 9 is a block diagram of an example electronic device 900. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

In various embodiments wireless circuitry 908 can include Bluetooth or BLE. Bluetooth low energy has 40 physical channels in the 2.4 GigaHertz (GHz) ISM band, each separated by 2 MHz. Bluetooth defines two transmission types: data and advertising transmissions. As such, three of these 40 channels are dedicated to advertising and 37 to data. Whether it is a beacon (transmitting location, weather, or other data) or a fitness watch making a long-term connection with a host (tablet or phone), most peripheral devices, at least initially, begin in advertising mode. Advertising allows devices to broadcast information defining their intentions. For ease of use, Bluetooth defines a single packet format for both advertising and data transmissions. This packet consists of four components: preamble (1 octet), access address (4 octets), Protocol Data Unit— PDU (2-257 octets), and Cyclic Redundancy Check—CRC (3 octets). The PDU segment is important, as it defines whether this packet is an advertising or data packet. The Advertising PDU packet contains a 16-bit header and a variable size payload. The advertising header defines 6 segments. The Length field is 6 bits and defines the size of the payload, i.e., how much stuff BLE wireless protocol can advertise. The Length may be between 6-37 octets and is defined by PDU Type. BLE advertising can have "x" number of octets for payload. This is where the PDU Type comes in. In Bluetooth low energy there are two reasons to advertise/broadcast: (1)

To establish a bi-direction connection between devices (such as a smart watch to a phone) and (2) Or to broadcast information without ever connecting to another device, such as a beacon transmitting data in a museum.

There can be 4 PDU Types:

ADV_IND: Known as Advertising Indications (ADV_IND), where a peripheral device requests connection to any central device (i.e., not directed at a particular central device). Example: A smart watch requesting connection to any central device.

ADV_DIRECT_IND: Similar to ADV_IND, yet the connection request is directed at a specific central device. Example: A smart watch requesting connection to a specific central device.

ADV_NONCONN_IND: Non connectable devices, advertising information to any listening device. Example: Beacons in museums defining proximity to specific exhibits.

ADV_SCAN_IND: Similar to ADV_NONCONN_IND, with the option additional information via scan responses. Example: A warehouse pallet beacon allowing a central device to request additional information about the pallet.

So, when a long-term connection is desired, the PDU Type is set to either ADV_IND or ADV_DIRECT_IND, depending on whether the peripheral is advertising to any device or a specific device. And when broadcasting general data without establishing a long-term connection, ADV_NONCONN_IND or ADV_SCAN_IND is the PDU Type of choice. Typical beacons would use ADV_NONCONN_IND, and a peripheral allowing access to more information such as our warehouse pallet, ADV_SCAN_IND may be a better choice.

Peripherals interface 916 couple the input and output peripherals of device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory, and secondary memory. The memory hierarchy can be implemented using any combination of random-access memory (RAM) (e.g., static random-access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 916, one or more processors 918, and controller 920 can be implemented on a single chip, such as processing system 904. In some other embodiments, they can be implemented on separate chips.

Processor(s) 918 can include hardware and/or software elements that perform one or more processing functions, such as mathematical operations, logical operations, data manipulation operations, data transfer operations, controlling the reception of user input, controlling output of information to users, or the like. Processor(s) 918 can be embodied as one or more hardware processors, microprocessors, microcontrollers, field programmable gate arrays (FPGAs), application-specified integrated circuits (ASICs), or the like.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)), and any other components typically associated with the generation, management, and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module 924 (or set of instructions), a location module 926 (or set of instructions), a ranging module 928 that is used as part of ranging operation described herein, and other application programs 934 (or set of instructions).

Operating system 922 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 926 can assist in determining the current position (e.g., coordinates or other geographic location identifiers) and motion of device 900. Modern positioning systems include satellite-based positioning systems, such as Global Positioning System (GPS), cellular network positioning based on "cell IDs," and Wi-Fi positioning technology based on a Wi-Fi network. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data Ranging module 928 can send/receive ranging messages to/from an antenna, e.g., connected to wireless circuitry 908. The messages can be used for various purposes, e.g., to identify a sending antenna of a device, determine timestamps of messages to determine a distance of mobile device 900 from another device. Ranging module 928 can exist on various processors of the device, e.g., an always-on processor (AOP), a UWB chip, and/or an application processor. For example, parts of ranging module 928 can determine a distance on an AOP, and another part of the ranging module can interact with a sharing module, e.g., to display a position of the other device on a screen in order for a user to select the other device to share a data item. Ranging module 928 can also interact with a reminder module that can provide an alert based on a distance from another mobile device.

The one or more applications 934 on device 900 can include any applications installed on the device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use light emitting diode (LED), liquid crystal display (LCD) technology, or light emitting polymer display (LPD) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising performing at a first electronic device:

detecting a triggering condition for enabling control of a second electronic device;

upon detection of the triggering condition, determining an increased rate of transmission of advertising signals of a wireless protocol for transmitting from a wireless transceiver of the first electronic device;

transmitting, during an advertising window, a plurality of advertising wireless signals at the increased rate via the wireless protocol;

receiving, from the second electronic device, one or more responses to the advertising wireless signals that were transmitted at the increased rate using the wireless protocol;

determining a distance measurement between the first electronic device and the second electronic device based on the one or more responses to the advertising wireless signals; and responsive to the distance measurement, based on the one or more responses to the advertising wireless signals between the first electronic device and the second electronic device, being less than a threshold value, enabling the second electronic device to control one or more components of the first electronic device, or enabling the first electronic device to control one or more components of the second electronic device.

2. The method of claim 1, wherein at least one of the plurality of advertising wireless signals includes a message causing the second electronic device to increase a scanning rate for the wireless protocol.

3. The method of claim 1, further comprising decreasing the rate of transmission of advertising wireless signals after a predetermined time period.

4. The method of claim 1, wherein the triggering condition comprises at least one of a cursor movement and powering on the first electronic device or the second electronic device within a time threshold.

5. The method of claim 1, wherein the control includes a one-to-one communications with the second electronic device.

6. The method of claim 1, wherein the control includes one-to-many communications with a plurality of electronic devices.

7. The method of claim 1, further comprising decreasing the rate of transmission of advertising wireless signals after determining the distance measurement within a defined probability.

8. The method of claim 1, further comprising determining, at an electronic device, that the control is selected on the first electronic device.

9. The method according to claim 1, wherein the first electronic device is a first mobile device, and wherein the second electronic device is a second mobile device.

10. The method according to claim 1, wherein the determining the distance measurement between the first electronic device and the second electronic device based on the one or more responses to the plurality of advertising wireless signals comprises:

determining a signal strength indicator from the responses to the plurality of advertising wireless signals; and correlating the signal strength indicator from the responses to the distance measurement.

11. A non-transitory computer-readable medium storing a set of instructions, the set of instructions comprising:

one or more instructions that, when executed by one or more processors of a first electronic device, cause the first electronic device to:

detect a triggering condition for enabling control of a second electronic device;

upon detection of the triggering condition, determining an increased rate of transmission of advertising signals of a wireless protocol transmitting from a wireless transceiver of the first electronic device;

transmit, during an advertising window, a plurality of advertising wireless signals at the increased rate via the wireless protocol;

receive, from the second electronic device, one or more responses to the advertising wireless signals that were transmitted at the increased rate using the wireless protocol;

determine a distance measurement between the first electronic device and the second electronic device based on the one or more responses to the advertising wireless signals; and responsive to the distance measurement, based on the one or more responses to the advertising wireless signals between the first electronic device and the second electronic device, being less than a threshold value, enabling the second electronic device to control one or more components of the first electronic device or enabling the first electronic device to control one or more components of the second electronic device.

12. The non-transitory computer-readable medium of claim 11, wherein at least one of the plurality of advertising wireless signals includes a message causing the second electronic device to increase a scanning rate for the wireless protocol.

13. The non-transitory computer-readable medium of claim 11, wherein the one or more instructions further cause the first electronic device to decrease the rate of transmission of advertising wireless signals after a predetermined time period.

14. The non-transitory computer-readable medium of claim 11, wherein the triggering condition comprises at least one of a cursor movement, and powering on the second electronic device within a time threshold.

15. The non-transitory computer-readable medium of claim 11, wherein the control includes one-to-one communications with the second electronic device.

16. The non-transitory computer-readable medium of claim 11, wherein the control includes one-to-many communications with a plurality of electronic devices.

17. A first electronic device, comprising:

one or more memories; and one or more processors, communicatively coupled to the one or more memories, configured to:

detect a triggering condition for enabling control of a second electronic device;

upon detection of the triggering condition, determining an increased rate of transmission of advertising signals of a wireless protocol transmitting from a wireless transceiver of the first electronic device;

transmit, during an advertising window, a plurality of advertising wireless signals at the increased rate via the wireless protocol;

receive, from the second electronic device, one or more responses to the advertising wireless signals that were transmitted at the increased rate using the wireless protocol;

determine a distance measurement between the first electronic device and the second electronic device based on the one or more responses to the advertising wireless signals; and responsive to the distance measurement, based on the one or more responses to the advertising wireless signals between the first electronic device and the second electronic device, being less than a threshold value, enabling the second electronic device to control one or more components of the first electronic device or enabling the first electronic device to control one or more components of the second electronic device.

18. The first electronic device of claim 17, wherein at least one of the plurality of advertising wireless signals includes a message causing the second electronic device to increase a scanning rate for the wireless protocol.

19. The first electronic device of claim 17, wherein the one or more processors are further configured to decrease the rate of transmission of advertising wireless signals after a predetermined time period.

20. The first electronic device of claim 17, wherein the triggering condition comprises at least one of a cursor movement, and powering on the second electronic device within a time threshold.

* * * * *